United States Patent [19]

Schmidt

[11] Patent Number: 5,558,589

[45] Date of Patent: Sep. 24, 1996

[54] TWO-MODE, COMPOUND-SPLIT, ELECTRO-MECHANICAL VEHICULAR TRANSMISSION

[75] Inventor: Michael B. Schmidt, Carmel, Ind.

[73] Assignee: General Motors Corporation, Detroit, Mich.

[21] Appl. No.: 504,625

[22] Filed: Jul. 20, 1995

[51] Int. Cl.$^6$ .................................................. B60K 41/28
[52] U.S. Cl. ................................................................ 475/5
[58] Field of Search ...................................... 475/5; 477/3

[56] References Cited

U.S. PATENT DOCUMENTS

| | | | |
|---|---|---|---|
| 2,571,284 | 10/1951 | Nims | 477/3 |
| 3,566,717 | 3/1971 | Berman et al. | 477/3 |
| 5,120,282 | 6/1992 | Fjallstrom | 475/5 |

*Primary Examiner*—Dirk Wright
*Attorney, Agent, or Firm*—Donald F. Scherer

[57] ABSTRACT

A two-mode, compound-split, electro-mechanical transmission utilizing an input for receiving power from an engine. A power output is also utilized to deliver power to the drive wheels of the vehicle. First and second motor/generators are used in conjunction with an energy storage device for accepting power from, and supplying power to, the first and second motor/generators. A control mechanism regulates power flow among the energy storage device and the motor/generators as well as between the first and second motor/generators. A compound planetary gear set having first and second planetary gear sub-sets is incorporated in the transmission. Each of the planetary gear sub-sets has an inner gear member and an outer gear member, each of which meshingly engages a plurality of planet gear members. Mechanical arrangements are utilized operatively to connect: (1) the first motor/generator to at least one of the gear members in the compound planetary gear set; (2) the second motor/generator to at least one of the other of the gear members in the compound planetary gear set; (3) the input to at least one of the remaining gear members in the compound planetary gear set; and, (4) at least one of the gear members in the compound planetary gear set to the power output.

16 Claims, 7 Drawing Sheets

TWO-MODE, COMPOUND-SPLIT, ELECTRO-MECHANICAL VEHICULAR TRANSMISSION

TECHNICAL FIELD

The present invention relates generally to vehicular transmissions. More particularly, the present invention relates to vehicular transmissions that are capable of receiving input power from an engine, a source of stored electrical energy, or both. Specifically, the present invention relates to a two-mode, compound-split, electro-mechanical vehicular transmission that utilizes a doubly compounded planetary gear set that is operatively connected to an engine and a motor/generator as well as the output shaft of the transmission. A second motor/generator is also mechanically connected—either directly or indirectly—to the transmission output shaft, and two modes, or gear trains, are selectively available, as by the utilization of at least two torque transfer devices, to transmit power from the engine and/or the motor/generators to the output shaft depending upon the desired, or required, power and/or speed to be delivered by the output shaft.

BACKGROUND OF THE INVENTION

The purpose of a vehicular transmission is to provide a neutral, at least one reverse and one or more forward driving ranges that impart power from an engine, and/or other power sources, to the driving wheels, as required to provide the necessary driving force and the desired performance.

A series propulsion system is a system in which energy follows a path from an engine to an electric storage device and then to an electrical motor which applies power to rotate the wheels. There is no direct mechanical connection between the engine and the wheels in a series propulsion system.

Transmissions adapted to receive the output power from either an engine or an electric motor, or both, have heretofore relied largely on what has been designated as series, hybrid propulsion systems. Such systems are designed with auxiliary power units (APU's) of relatively low power for minimum emissions and best fuel economy. However, such combinations of small APU's and even large energy storage devices do not accommodate high-average power vehicles or address duty cycles that demand continuous, constant speed operation. Steep grades and sustained high-average cruising speeds at desired high efficiencies are not achievable with a typical, series, hybrid transmission configuration.

The challenge, therefore, is to provide a power system that will operate at high efficiencies over a wide variety of operating conditions. Desirable electric variable transmissions should leverage the benefits of a series, hybrid transmission for desirable low-average power duty cycles—i.e.: low speed start/stop duty cycles—as well as the benefits of a parallel hybrid transmission for high-average output power, high speed duty cycles.

Moreover, perfecting a concept wherein two modes, or gear trains, are available for synchronous selection by the on-board computer to transmit power from the engine and/or the motor/generator to the output shaft results in a hybrid transmission having an extremely wide range of applications.

One of the most successful substitutes for the series hybrid transmission is the variable, two-mode, input-split, parallel, hybrid electric transmission. Such a transmission utilizes an input means to receive power from the vehicle engine and a power output means to deliver power to drive the vehicle. First and second motor/generators are connected to energy storage devices, such as batteries, so that the energy storage devices can accept power from, and supply power to, the first and second motor/generators. A control unit regulates power flow among the energy storage devices and the motor/generators as well as between the first and second motor/generators.

A variable, two-mode, input-split, parallel, hybrid electric transmission also employs at least one planetary gear set. The planetary gear set has an inner gear member and an outer gear member, each of which meshingly engages a plurality of planet gear members. The input means is operatively connected to one of the gear members in the planetary gear set, and means are provided operatively to connect the power output means to another of the gear members in the planetary gear set. One of the motor/generators is connected to the remaining gear member in the planetary gear set, and means are provided operatively to connect the other motor/generator to the output shaft.

Operation in the first or second mode may be selectively achieved by using torque transfer devices. In one mode, the output speed of the transmission is proportional to the speed of one motor/generator, and in the second mode the output speed of the transmission is generally proportional to the speed of the other motor/generator.

In some embodiments of the variable, two-mode, input-split, parallel, hybrid electric transmission a second planetary gear set is employed. In addition, some embodiments may utilize three torque transfer devices—two to select the operational mode desired of the transmission and the third selectively to disconnect the transmission from the engine. In other embodiments, all three torque transfers may be utilized to select the desired operational mode of the transmission.

With reference, again, to a planetary gear set, the planetary gear members are normally supported for rotation on a carrier that is itself rotatable. When the sun gear is held stationary and power is applied to the ring gear, the planet gear members rotate in response to the power applied to the ring gear and thus "walk" circumferentially around the fixed sun gear to effect rotation of the carrier in the same direction as the direction in which the ring gear is being rotated.

When any two members of a planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be determined by knowing the number of teeth present in the gear members of the planetary gear set.

Whenever the carrier is restrained from spinning freely, and power is applied to either the sun gear or the ring gear, the planet gear members act as idlers. In that way, the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

As those skilled in the art will appreciate, a transmission system using a power split arrangement will receive power from two sources. Utilization of one or more planetary gear sets permits two or more gear trains, or modes, by which to deliver power from the input shaft of the transmission to the output shaft thereof. As such, it is well known in the art that a multi-range, power split, hydro-mechanical, or hydrostatic, transmission will utilize at least one planetary gear set. Typically, a planetary gear set will have one member connected to the power source, one member connected to the output of the transmission, and the final member of the planetary gear set will be connected to a hydrostatic drive. This is particularly advantageous because a hydrostatic drive has the same speed and torque capabilities in the reverse direction as it does in the forward direction, which is useful in military type vehicles, such as tanks and personnel carriers.

However, a transmission for a passenger vehicle, such as a bus, has somewhat different requirements. For example, a bus only requires that the maximum reverse speed be twenty percent (20%) of the maximum forward speed capacity, while still requiring that the maximum power available for the forward drive range also be available for reverse drive range.

By utilizing a hydrostatic unit in combination with a planetary gear system, an efficient, multi-range power transfer system can be developed for a passenger vehicle. The planetary gear system is very useful in combining two input power sources, such as the mechanical input received directly from an engine and the input power received from the hydrostatic drive. The efficiency of this configuration is dependent upon how much power is transferred through the hydrostatic drive. The more power that is received directly from the engine (the mechanical path), the higher the overall efficiency of the transmission. Thus, the maximum efficiency of the transmission is realized when the speed of the hydrostatic drive is zero.

As is well known to the art, there are several drawbacks in the use of hydrostatic drives in transmission systems. Typically, hydrostatic pumps and motors are not conducive to concentric and compact transmission design. For example, efficient hydrostatic units cannot accept another shaft operating concentrically through their pump and motor shafts. Therefore, a hydrostatic pump and motor will not be on the transmission centerline, but on a parallel main shaft with external gearing to transfer power from the hydrostatic unit to the centerline of the transmission. As a result, a hydrostatic pump and motor are not compatible with compact concentric transmission designs. Furthermore, hydrostatic units that operate at greater than 5,000 pounds per square inch (psi) are very noisy.

One possible solution to the aforementioned problems, is to replace the hydro-mechanical transmission with an all-electric drive transmission. However, all-electric transmission units have their own peculiar problems. In particular, the all-electric units are inefficient because engine power is transformed into electrical power to drive a motor, and that electrical power is then transformed back into mechanical, rotary power by the motor to drive the vehicle. Thus, each transformation of mechanical to electrical power, and vice versa between the engine and the drive wastes power.

As successful as the variable, two-mode, input-split, parallel, hybrid electric transmission is, no mechanical point exists in the first mode. That is, neither of the motor/generators is stationary at any time during operation of the transmission in the first mode. This is a drawback inasmuch as the maximum mechanical efficiency in the transfer of power from the engine to the output occurs when one of the motor/generators is at a mechanical point—i.e.: stationary. In variable, two-mode, input-split, parallel, hybrid electric transmissions, however, there is one point in the second mode at which one of the motor/generators is not rotating such that all the engine power is transferred mechanically to the output.

Accordingly, there is a need in the art for a large, horsepower transmission system which provides maximum power with little additional power provided by the electric storage device. It is also desirable to enhance overall efficiency at high output speeds.

SUMMARY OF THE INVENTION

It is, therefore, a primary object of the present invention to provide a novel, two-mode, compound-split, electro-mechanical transmission that provides the desired high efficiency sought for continuous, constant-speed operation as well as high-average power applications.

It is another object of the present invention to provide a novel transmission, as above, that provides a mechanical point in the first mode in order to enhance the mechanical transfer of power from the engine to the output.

It is a further object of the present invention to provide a novel transmission, as above, that provides a mechanical point in the first mode in order to enhance the overall efficiency of the transmission.

It is still another object of the present invention to provide a novel transmission, as above, that provides at least two mechanical points in the second mode as well as one in the first mode.

It is yet another object of the present invention to provide novel transmission, as above, that provides one mechanical point in the second mode at which one motor/generator is stationary and a second mechanical point in the second mode at which the other motor/generator is stationary—thereby enhancing the ability to provide high overall efficiency, even at high output speeds.

It is an even further object of the present invention to provide a novel transmission, as above, that provides an additional zero power point for one of the motor/generators in the second mode, also to enhance the high overall efficiency of the transmission, particularly at high output speeds.

These and other objects of the invention, as well as the advantages thereof over existing and prior art forms, which will be apparent in view of the following detailed specification, are accomplished by means hereinafter described and claimed.

In general, a two-mode, compound-split, electro-mechanical transmission embodying the concepts of the present invention utilizes an input for receiving power from an engine. A power output is also utilized to deliver power to the drive wheels of the vehicle. First and second motor/ generators are used in conjunction with an energy storage device for accepting power from, and supplying power to, the first and second motor generators. A control regulates power flow among the energy storage device and the motor/ generators as well as between the first and second motor/ generators.

A compound planetary gear set having first and second planetary gear sub-sets is incorporated in a two-mode, compound-split, electro-mechanical transmission. Each of the planetary gear sub-sets has an inner gear member and an outer gear member, each of which meshingly engage a plurality of planet gear members. A mechanical arrangement is utilized operatively to connect the first motor/generator to at least one of the gear members in the compound planetary gear set. A mechanical arrangement is also utilized operatively to connect the second motor/generator to at least one of the other of the gear members in the compound planetary gear set. A further mechanical arrangement is utilized operatively to connect the engine input to at least one of the remaining gear members in the compound planetary gear set. Finally, a mechanical arrangement is also utilized operatively to connect at least one of the gear members in the compound planetary gear set to the power output of the transmission.

To acquaint persons skilled in the arts most closely related to the present invention, one preferred embodiment of a two-mode, compound-split, electro-mechanical transmission that illustrates a best mode, and four alternative embodiments, now contemplated for putting the invention into practice are described herein by, and with reference to, the annexed drawings that form a part of the specification. The exemplary two-mode, compound-split, electro-mechanical transmission is described in detail without attempting to show all of the various forms and modifications in which the invention might be embodied. As such, the embodiments shown and described herein are illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
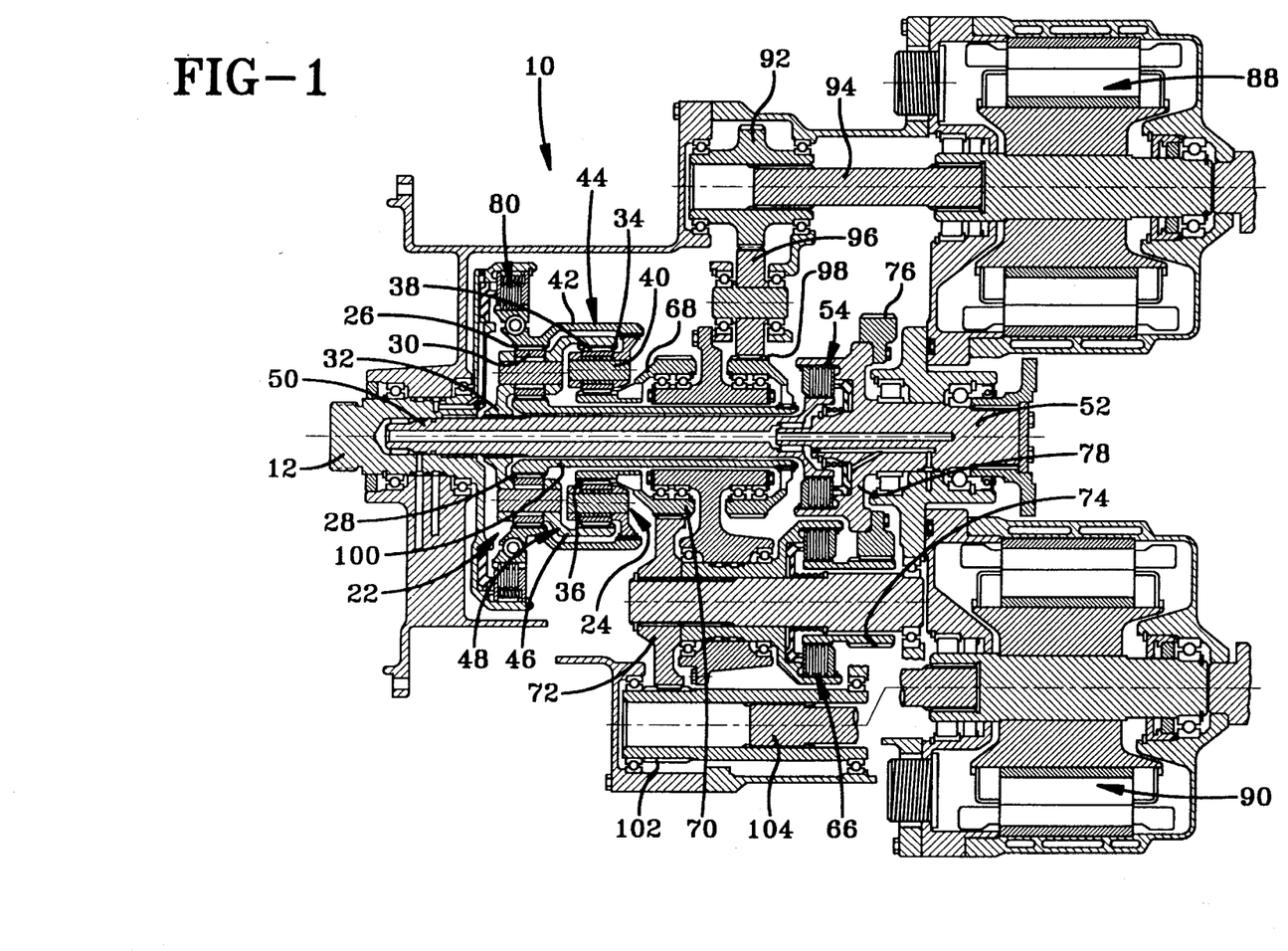
FIG. 1 is a diagrammatic representation of one preferred form of a two-mode, compound-split, electro-mechanical transmission embodying the concepts of the present invention.
Figure 2:
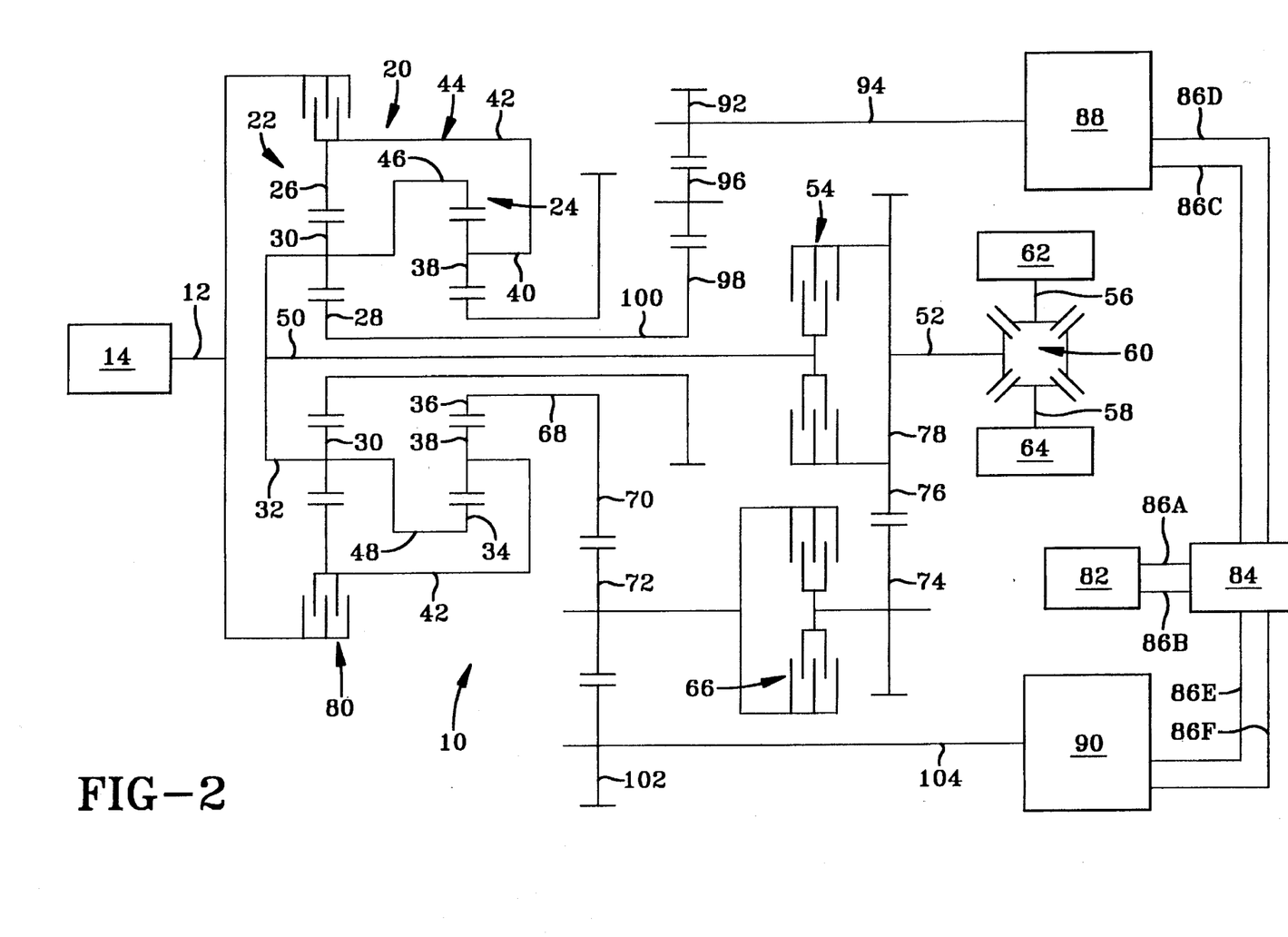
FIG. 2 is a schematic representation of the preferred embodiment depicted in FIG. 1.

One representative form of a two-mode, compound-split, electro-mechanical transmission embodying the concepts of the present invention is designated generally by the numeral 10 on the accompanying drawings. One preferred form of the representative hybrid transmission 10 is depicted in FIGS. 1 and 2. With particular reference, then, to FIGS. 1 and 2, the hybrid transmission 10 has an input shaft means 12 that is directly driven by an engine 14. In the embodiment depicted, the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input— operate at a constant speed of approximately 2100 RPM, as represented by line 16 on FIG. 3. The input shaft 12 is also selectively connected to a compound planetary gear set 20.

The compound planetary gear set 20 includes first and second planetary gear sub-sets 22 and 24. The first planetary gear sub-set 22 has an outer gear member 26, generally designated as the ring gear, which circumscribes an inner gear member 28, generally designated as the sun gear. A plurality of planet gear members 30 are rotatably mounted on a carrier 32 such that each planet gear member 30 meshingly engages both the outer gear member 26 and the inner gear member 28.

The second planetary gear sub-set 24 also has an outer gear member 34, generally designated as the ring gear, which circumscribes an inner gear member 36, generally designated as the sun gear. A plurality of planet gear members 38 are rotatably mounted on a carrier 40 such that each planet gear 38 meshingly engages both the outer gear member 34 and the inner gear member 36.

The first and second planetary gear sub-sets 22 and 24 are compounded in that the outer gear member 26 of the first planetary gear sub-set 22 may be conjoined, as through a first sleeve shaft 42, to the carrier 40 of the second planetary gear sub-set 24 to constitute the conjoined first compounded gear members 44. The planetary gear sub-sets 22 and 24 are further compounded in that the carrier 32 of the first planetary gear sub-set 22 may also be conjoined, as through a second sleeve shaft 46, to the outer gear member 34 of the second planetary gear sub-set 24 to constitute the conjoined second compounded gear members 48.

The carrier 32 of the first planetary gear sub-set 22 is connected to a transmission drive shaft 50. The transmission drive shaft 50 is connected to an output shaft 52, as through a first torque transfer device 54, that drives the axles 56 and 58 through a differential 60. When the hybrid transmission 10 is used in a land vehicle, each axle 56 and 58 terminates in a respective wheel 62 and 64.

The inner gear member 36 of the second planetary gear sub-set 24 is connected to the output shaft 52, as through a second torque transfer device 66. Specifically, the inner gear member 36 is connected to a third sleeve shaft 68 that terminates in a transfer gear member 70 that meshingly engages a first connecting gear member 72. The first connecting gear member 72 is connected to a second connecting gear member 74 through the second torque transfer device 66. The second connecting gear member 74 meshingly engages a drive gear 76 that is affixed to the output shaft 52. It will be noted that the hub portion 78 of the drive gear 76 may be connected to the first torque transfer device 54.

The input shaft 12 may be selectively connected to the conjoined outer gear member 26 of the first planetary gear sub-set 22 and the carder 40 of the second planetary gear sub-set 24 by a third torque transfer device 80 which operates as a clutch between the input shaft 12 and the first compounded gear members 44.

As should be apparent from the foregoing description, and with particular reference to FIGS. 1 and 2, the transmission 10 selectively receives power from the engine 14. As will now be explained, the hybrid transmission also receives power from an electric storage device 82. The electric storage device 82 may be one or more batteries. Other electric storage devices that have the ability to store electric power and dispense electric power may be used in place of the batteries without altering the concepts of the present invention. The electric storage device 82 communicates with an electrical control unit (ECU) 84 by transfer conductors 86A and 86B. The ECU 84 communicates with a first motor/generator 88 by transfer conductors 86C and 86D, and the ECU 84 similarly communicates with the second motor/generator 90 by transfer conductors 86E and 86F.

As apparent from the previous paragraph, a particular structural member, component or arrangement may be employed at more than one location. When referring generally to that type of structural member, component or arrangement, a common numerical designation will be employed. However, when one of the structural members, components or arrangements so identified is to be individually identified, it will be referenced by virtue of a letter suffix employed in combination with the numerical designation employed for general identification of that structural member, component or arrangement. Thus, there are at least six transfer conductors which are generally identified by the numeral 86, but the specific, individual transfer conductors are, therefore, identified as 86A, 86B, 86C, 86D, 86E and 86F in the specification and on the drawings. This same suffix convention shall be employed throughout the specification.

A drive gear 92 is presented from a connecting shaft 94 that delivers power to, and receives power from, the first motor/generator 88. The drive gear 92 meshingly engages an idler gear 96 which, in turn, meshingly engages a transfer gear 98 that is secured to one end of a sleeve shaft 100. The other end of the sleeve shaft 100 is secured to the inner gear member 28 of the first planetary gear sub-set 22.

Another drive gear 102 is presented from a connecting shaft 104 that delivers power to, and receives power from, the second motor/generator 90. The drive gear 102 meshingly engages the first connecting gear member 72 which, as was previously explained, is meshingly engaged with the transfer gear member 70—and thus the inner gear member 36 of the second planetary gear sub-set 24. The first connecting gear member 72 is also connected to the second connecting gear member 74 through the second torque transfer device 66.

Operation of the Exemplary Preferred Embodiment

Introduction

The operator of the vehicle has three primary devices to control the transmission 10. One of the primary control devices is a well known drive range selector (not shown) that directs the ECU 84 to configure the transmission for either the park, reverse, neutral, or forward drive range. The second and third primary control devices constitute an accelerator pedal (not shown) and a brake pedal (also not shown). The information obtained by the ECU 84 from these three primary control sources will hereinafter be referred to as the "operator demand." The ECU 84 also obtains information from both the first and second motor/generators 88 and 90, respectively, the engine 14 and the electric storage device 82. In response to an operator's action, the ECU 84 determines what is required and then manipulates the selectively operated components of the hybrid transmission 10 appropriately to respond to the operator demand.

For example, in the exemplary embodiment shown in FIGS. 1 and 2, when the operator selects a drive range and manipulates either the accelerator pedal or the brake pedal, the ECU 84 thereby determines if the vehicle should accelerate or decelerate. The ECU 84 also monitors the state of the power sources, and determines the output speed from the transmission required to effect the desired rate of acceleration or deceleration. Under the direction of the ECU 84 the transmission is capable of providing a range of output speeds from slow to fast in order to meet the operator demand.

In order to provide a full explanation as to the operation of a transmission embodying the concepts of the present invention, a description of the operational modes employed to achieve the output power and speeds necessary to meet the operator demand under various operating conditions will be provided with respect to the first of the preferred embodiments. The following descriptions describe the full power operational states of the particular transmission identified by the numeral 10. Once the overall concepts as to how this preferred embodiment operates are understood, those concepts will likewise apply to the several alternative embodiments subsequently described herein.

As will become apparent from the detailed description which follows, the transmission 10 is a two-mode, compound-split, electro-mechanical, vehicular transmission. In other words, output shaft 52 receives power through two distinct gear trains within the transmission 10. A first mode, or gear train, is utilized when the output shaft 52 is driven by virtue of the second torque transfer device 66. A second mode, or gear train, is utilized when the output shaft 52 is driven through the first torque transfer device 54.

Those skilled in the art will appreciate that each of these two modes, or gear trains, can be configured with the ECU 84 to provide a range of output speeds from relatively slow to relatively fast within each mode of operation. This combination of two modes with a slow to fast output speed range in each mode allows the transmission 10 to propel a vehicle from a stopped condition to highway speeds and meet the other objects of the invention. Additionally, the ECU 84 coordinates operation of the transmission 10 so as to allow synchronized shifts between the modes. As noted, operation of the preferred embodiment will be described as it relates to full power operation inasmuch as that approach will fully describe the general operational concepts.

I. First Mode

In the first mode of operation, and when the ECU 28 has determined that the operator desires to accelerate, the second and third torque transfer devices 66 and 80, respectively, are applied. The first torque transfer device 54 is not applied. In this situation, the engine 14 applies driving power to the first compounded gear members 44 which turn against the freely rotatable second compounded gear members 48. This results in the inner gear member 36 of the second planetary gear sub-set 24 rotating in the same direction as the first compounded gear members 44, but the inner gear member 28 of the first planetary gear sub-set 22 rotates in the opposite direction.

As such, rotation of the transfer gear 98 is in the same direction as that of the inner gear member 28, and, because of the interposition of the idler gear 96, the drive gear 92 rotates in the same direction as the inner gear member to operate the first motor/generator 88 as a generator. The ECU 84 applies the electrical energy generated by the first motor/generator 88 to operate the second motor/generator 90 as a motor. The rotational speed of the first motor/generator 28 during initial phase of operation in the first mode is represented by line 110A on FIG. 3, and the rotational speed of motor/generator 90 during this phase of operation in the first mode is represented by line 112A on FIG. 3.

Figure 3:
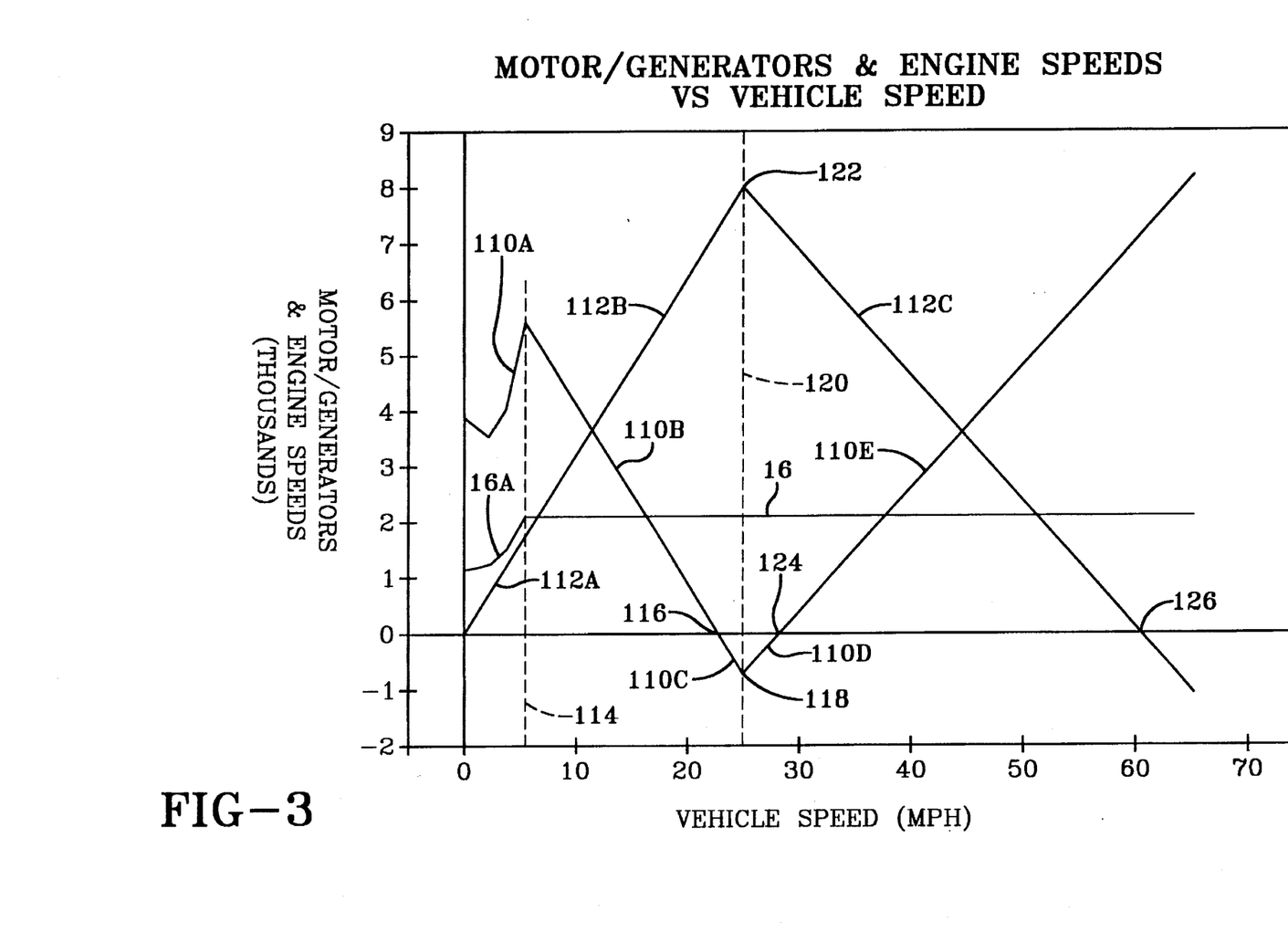
FIG. 3 is a graphical representation of the rotations per minute (RPM) of each of the motor/generators as well as the engine relative to the speed of the vehicle as obtained by virtue of the transmission depicted in FIGS. 1 and 2.

The initial phase of operation in the first mode terminates at line 114 on FIG. 3. Each point along line 114 has a constant abscissa value in the Cartesian coordinate system of the graph and that line is, therefore, designated as the abscissa line. As located, the abscissa line 114 delineates the vehicular speed at which the engine 14 reaches its full speed and power. During the initial phase of operation in the first mode, the electric storage device 82 need not apply power to either motor/generator 88 or 90. The engine provides all power to the transmission 10 during this phase, and the speed curve for the engine 14 during this phase is designated at 16A on FIG. 3.

Because the inner gear member 36 of the second planetary gear sub-set 24 is rotating in the same direction as the first compounded gear members 44, the first connecting gear 72 rotates in the opposite direction, and through the second torque transfer device 66, in unison with the second connecting gear 74 to rotate the output shaft 52 in the same direction as the input shaft 12. Operating as a motor, the second motor/generator 90 thereby rotates drive gear 102 in the direction required to enhance the application of power to the first connecting gear 72. Hence, the second motor/generator 90 and the engine 14 combine to power the output shaft 52 initially, and as will be hereinafter more fully explained, throughout the first mode of operation.

As the vehicle reaches an initial speed of about 5 MPH the ECU 84 applies the full power available from the electric storage device 82 to continue operation of the second motor/generator 90 as a motor, as represented by curve 112B on FIG. 3. At the same time, the first motor/generator 88 continues to serve as a generator, but at a decreasing rotational speed, as represented by curve 110B on FIG. 3.

At point 116 along curve 110 the rotational speed of motor/generator 88 drops to zero RPM. Hence, a mechanical point 116 is achieved within the first mode of operation such that the full power of the engine 14 is available, together with the full power of the electric storage device 82, to rotate the output shaft 52. From mechanical point 116 to the shift point 118 the motor/generator 88 reverses its rotational direction to operate as a motor, as represented by line 110C on FIG. 3. This concludes operation of the hybrid transmission 10 in the first mode.

II. Second Mode

At the shift point 116—which is included on a second abscissa line 120—operation in the second mode commences by disengaging the second torque transfer device 66 and applying the first torque transfer device 54. The third torque transfer device 80 remains engaged.

At the beginning of the second mode of operation, the first motor/generator 88 has—as can be seen by reference to the abscissa line 120—already reached its maximum reverse rotation while operating as a motor, and the second motor/generator 90 has already reached its maximum rotational speed as a motor, as designated at point 122 along curve 112 on FIG. 3.

Returning to FIG. 2, it should be observed that as the shift is made to the second mode of operation, the second compounded gear members 48 are connected—through the transmission drive shaft 50 and the first torque transfer device 54—to the output shaft 52 such that those conjoined members rotate in the same direction as the input shaft 12. The power delivered by the second motor/generator 90 is fed back into the inner gear member 36 of the second planetary gear sub-set 24 to enhance the power delivered to the output shaft 52. Initially, the first motor/generator 88 rotates to reduce its speed, but after the mechanical point 124 (FIG. 3)—where the rotational direction of the first motor/generator 88 reverses—the first motor/generator 88 operates as a motor to enhance the power applied to the output shaft 52 by the transmission 10. Thus, for the major portion of the operation within the second mode both motor/generators 88 and 90 operate as motors.

Turning, then, to FIG. 3 it can be observed that beyond the abscissa line 120 the second motor/generator 90 continues to operate as a motor, but at a decreasing rotational speed, as designated by curve 112C. Beyond the abscissa line 120, as noted supra, the first motor/generator 88 changes operation from a motor and operates—along curve 110D—as a generator that continuously reduces its reverse rotational speed to zero, as designated at point 124. This constitutes the first mechanical point during operation in the second mode. Beyond mechanical point 124 the first motor/generator 88 reverts to operation as a motor with continually increasing speed, as represented by curve 110E on FIG. 3. The first motor/generator continues to operate as a motor throughout the remainder of full power operation, which, in the example depicted, is approximately 65 MPH, the maximum vehicular speed depicted.

In the second mode, the second motor/generator 90 continues to operate as a motor, as depicted by curve 112C on FIG. 3. It should also be appreciated that during operation of the second motor/generator 90 along curve 112C the power output from that motor drops to zero. The power zero point is designated at point 126. The power in unit 90 may go to zero as much as two times in the second mode. Once when the motor torque is equal to zero—depending upon the charge in the battery—and a second time when the motor is at zero speed. This second mechanical point is represented by point 126.

III. Reverse Mode

In the reverse mode of operation, only the second torque transfer device 66 is applied. The first and third torque transfer devices 54 and 80, respectively, are not applied. As such, reverse operation is powered solely by the second motor/generator 90 acting as a motor. With only the second torque transfer device 66 applied—and with the second motor/generator 90 operating as a motor, but in a reverse direction—the ECU 84 provides power from the electric storage device 82 to power the drive gear 102 in the direction necessary such that the meshing engagement of the drive gear 102 with the connecting gear 72 drives the second connecting gear 74 to retro-rotate the drive gear 76 and the output shaft 52 to effect reverse movement to the vehicle.

IV. Summation

A two-mode, compound-split, electro-mechanical transmission 10 embodying the concepts of the present invention provides exceptional overall operating efficiency—particularly at high output speeds.

First alternative embodiment

Figure 4:
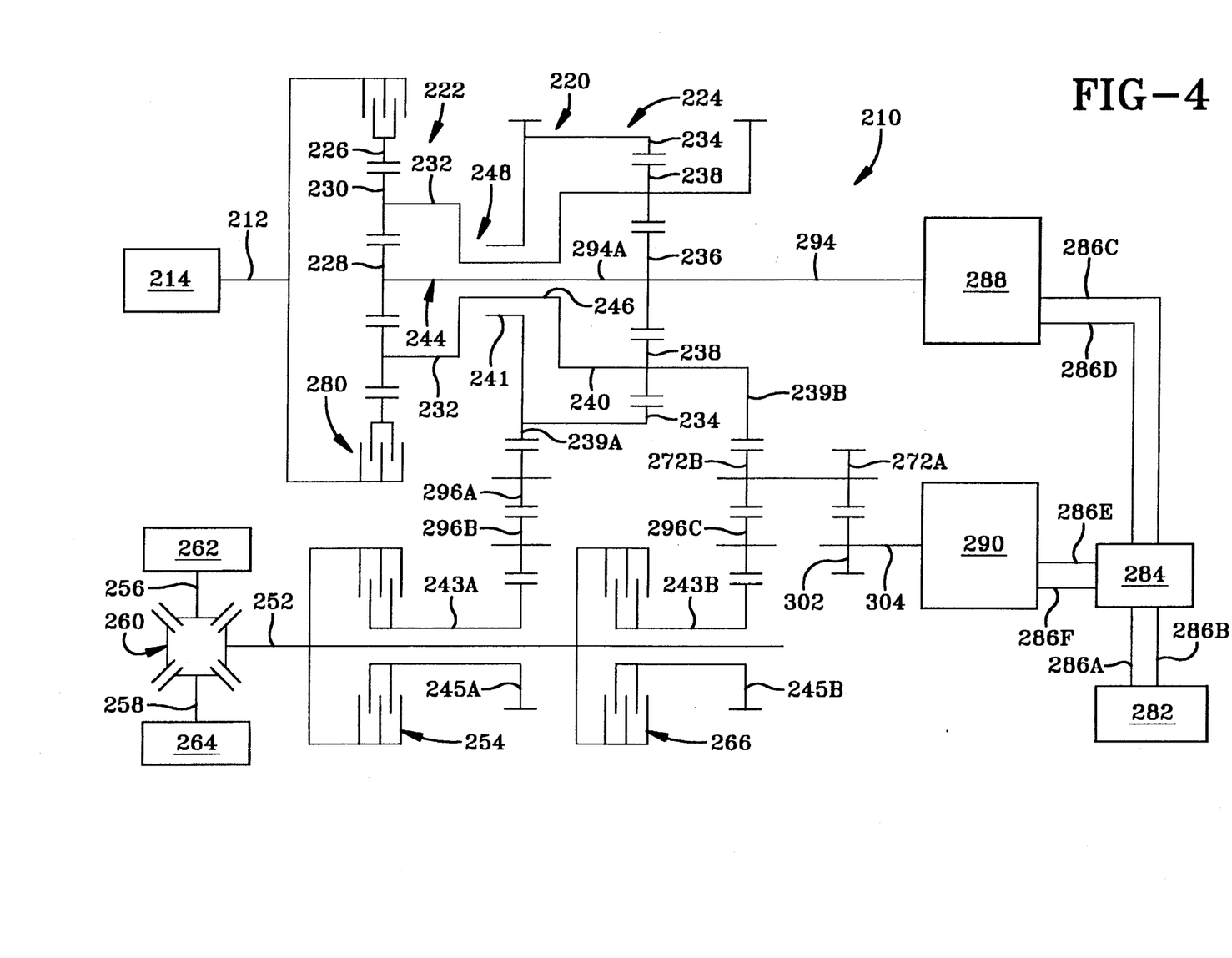
FIG. 4 is a schematic representation of a first alternative form of a two-mode, compound-split, electro-mechanical transmission embodying the concepts of the present invention.

A first alternative form of a two-mode, compound-split, electro-mechanical transmission embodying the concepts of the present invention is designated generally by the numeral 210 on FIG. 4 of the accompanying drawings. With particular reference, then, to FIG. 4, the hybrid transmission 210 has an input shaft means 212 that is directly driven by an engine 214. In this embodiment, as well, the engine 214 may be a fossil fuel engine, such as a diesel engine which is readily adapted to provide its available power output delivered at a constant number of revolutions per minute (RPM). In the first alternative embodiment to which FIG. 4 is directed, the engine 214 can—after start-up, and during the majority of its input—operate at a constant speed of, for example, approximately 2100 RPM. The input shaft 212 is also selectively connected to a compound planetary gear set 220.

The compound planetary gear set 220 includes first and second planetary gear sub-sets 222 and 224. The first planetary gear sub-set 222 has an outer gear member 226, generally designated as the ring gear, which circumscribes an inner gear member 228, generally designated as the sun gear. A plurality of planet gear members 230 are rotatably mounted on a carder 232 such that each planet gear member 230 meshingly engages both the outer gear member 226 and the inner gear member 228.

The second planetary gear sub-set 224 also has an outer gear member 234, generally designated as the ring gear, which circumscribes an inner gear member 236, generally designated as the sun gear. A plurality of planet gear members 238 are rotatably mounted on a carrier 240 such that each planet gear 238 meshingly engages both the outer gear member 234 and the inner gear member 236.

The first and second planetary gear sub-sets 222 and 224 are compounded in that the inner gear members 228 and 236 of the respective first and second planetary gear sub-sets 222 and 224, respectively, are secured, one to the other, as by an extension shaft portion 294A of shaft 294 to constitute the conjoined first compounded gear members 244. It will be noted that the shaft 294 delivers power to, and receives power from, a first motor/generator 288. The first and second planetary gear sub-sets 222 and 224 are further compounded in that the carrier 232 in the first planetary gear sub-set 222 is secured to the carrier 240 of the second planetary gear sub-set 224, as by a concentrically inner sleeve shaft 246. The combination of the two carriers 232 and 240 as well as the sleeve shaft 246 constitute the conjoined second compounded gear members 248 in the planetary gear set 220.

The outer gear member 234 of the second planetary gear sub-set 224 is connected to a first transfer gear member 239A that is supported on a concentrically outer sleeve shaft 241. The transfer gear member 239A is connected to the geared portion 245A of a first output sleeve shaft 243A through a pair of intervening idler gears 296A and 296B. The output sleeve shaft 243A is, in turn, selectively, connected to a output shaft 252 through the first torque transfer device 254. The output shaft 252 drives the axles 256 and 258 through a differential 260. When the hybrid transmission 210 is used in a land vehicle, each axle 256 and 258 terminates in a respective wheel 262 and 264.

The second compounded gear members 248 present a second transfer gear 239B that is, in turn, connected to the geared portion 245B of a second output sleeve shaft 243B through intervening gear members 272B and 296C. The intervening gear members specifically constitute a second connecting gear 272B (which will be hereinafter more fully explained) that meshingly engages not only the second transfer gear member 239B but also a third idler gear 296C. The idler gear 296C meshingly engages the geared portion 245B of a second output sleeve shaft 243B. The output sleeve shaft 243B is selectively connected to the output shaft 252, as through the second torque transfer device 266.

The input shaft 212 may be selectively connected to the outer gear member 226 of the first planetary gear sub-set 222 by a third torque transfer device 280 which operates as a clutch between the input shaft 212 and the outer gear member 226 of the first planetary gear sub-set 222.

As should be apparent from the foregoing description, and with particular reference to FIG. 4, the hybrid transmission 210 selectively receives power from the engine 214. As will now be explained, the hybrid transmission 210 also receives power from an electric storage device 282. The electric storage device 282 may be one or more batteries. Other electric storage devices that have the ability to store, and dispense, electric power may be used in place of the batteries without altering the concepts of the present invention. The electric storage device 282 communicates with an electrical control unit (ECU) 284 by transfer conductors 286A and 286B. The ECU 284 communicates with the first motor/generator 288 by transfer conductors 286C and 286D, and the ECU 284 similarly communicates with the second motor/generator 290 by transfer conductors 286E and 286F.

A drive gear 302 is presented from a connecting shaft 304 that delivers power to, and receives power from, the second motor/generator 290. The drive gear 302 meshingly engages a first connecting gear member 272A which is mounted for common rotation with the second connecting gear 272B. As previously noted herein, the second connecting gear 272B meshingly engages not only the second transfer gear member 239B but also a third idler gear 296C.

Second alternative embodiment

Figure 5:
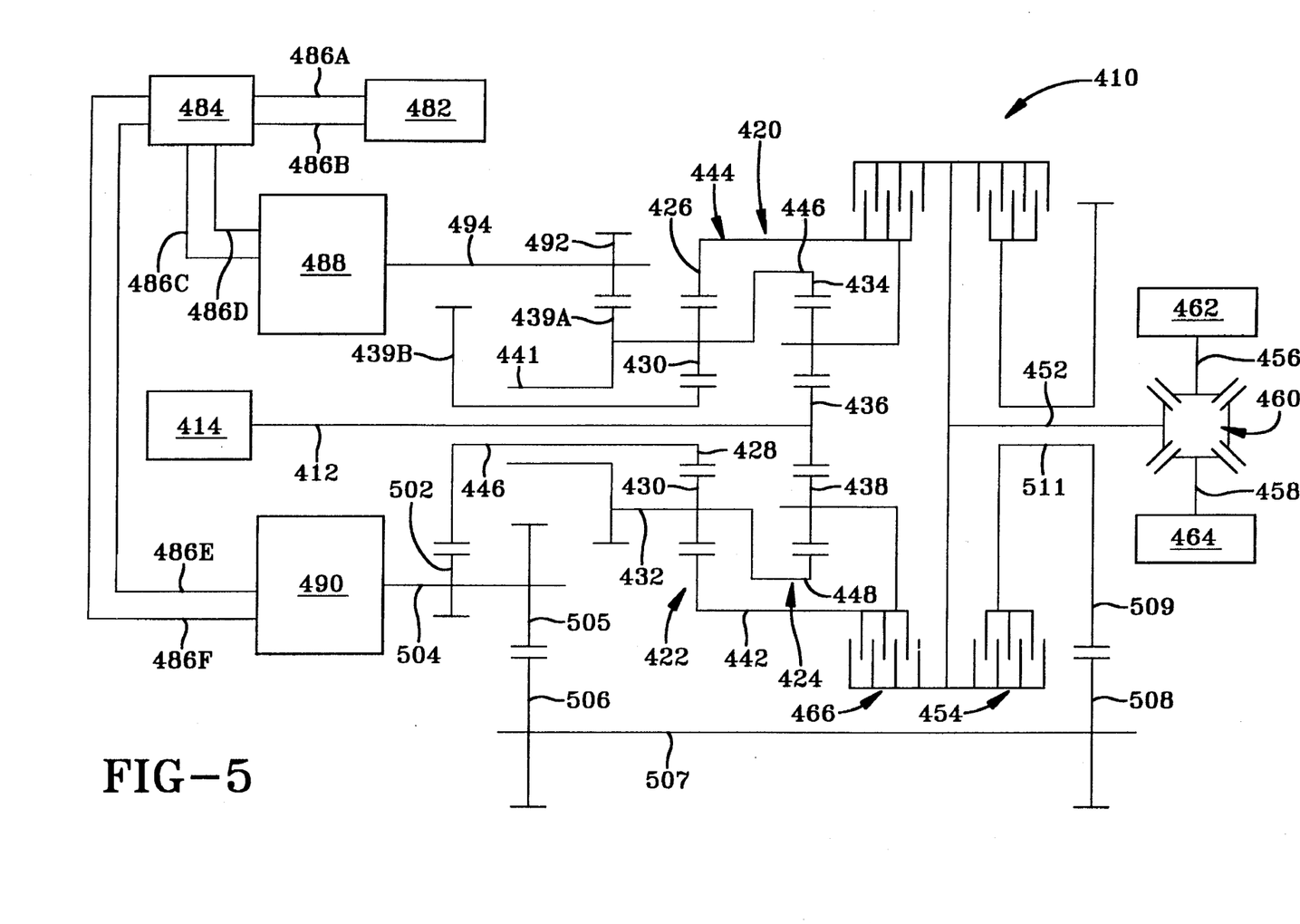
FIG. 5 is a schematic representation of a second alternative form of a two-mode, compound-split, electro-mechanical transmission embodying the concepts of the present invention.

A second alternative form of a two-mode, compound-split, electro-mechanical transmission embodying the concepts of the present invention is designated generally by the numeral 410 on FIG. 5 of the accompanying drawings. With particular reference, then, to FIG. 5, the hybrid transmission 410 has an input shaft means 412 that is directly driven by an engine 414. In this embodiment, as well, the engine 414 may be a fossil fuel engine, such as a diesel engine which is readily adapted to provide its available power output delivered at a constant number of revolutions per minute (RPM). In the second alternative embodiment to which FIG. 5 is directed, the engine 414 can—after start-up, and during the majority of its input—operate at a constant speed of, for example, 2100 RPM. The input shaft 412 is also selectively connected to a compound planetary gear set 420.

The compound planetary gear set 420 includes first and second planetary gear sub-sets 422 and 424. The first planetary gear sub-set 422 has an outer gear member 426, generally designated as the ring gear, which circumscribes an inner gear member 428, generally designated as the sun gear. A plurality of planet gear members 430 are rotatably mounted on a carrier 432 such that each planet gear member 430 meshingly engages both the outer gear member 426 and the inner gear member 428.

The second planetary gear sub-set 424 also has an outer gear member 434, generally designated as the ring gear, which circumscribes an inner gear member 436, generally designated as the sun gear. A plurality of planet gear members 438 are rotatably mounted on a carrier 440 such that each planet gear member 438 meshingly engages both the outer gear member 434 and the inner gear member 436.

The first and second planetary gear sub-sets 422 and 424 are compounded in that the outer gear member 426 of the first planetary gear sub-set 422 may be conjoined, as through a first sleeve shaft 442, to the carrier 440 of the second planetary gear sub-set 424 to constitute the conjoined first compounded gear members 444. The planetary gear sub-sets 422 and 424 are further compounded in that the carrier 432 of the first planetary gear sub-set 422 may also be conjoined, as through a second sleeve shaft 446, to the outer gear member 434 of the second planetary gear sub-set 424 to constitute the conjoined second compounded gear members 448.

The first compounded gear members 444 are selectively connected to a output shaft 452, as through a second torque transfer device 466, that drives the axles 456 and 458 through a differential 460. When the hybrid transmission 410 is used in a land vehicle, each axle 456 and 458 terminates in a respective wheel 462 and 464.

The inner gear member 436 of the second planetary gear sub-set 424 is directly connected to the engine 414 by input shaft 412.

The second compounded gear members 448 are connected to an outer sleeve shaft 441 that circumscribes a hereinafter described inner sleeve shaft 446. The outer sleeve shaft 441 presents a first transfer gear 439A that meshingly engages the drive gear 492 mounted on a connecting shaft 494 that delivers power to, and receives power from, the first motor/generator 488. The inner gear member 428 of the first planetary gear sub-set 422 is connected to the inner sleeve shaft 446 that circumscribes the input shaft 412. The inner sleeve shaft 446 presents a transfer gear 439B that meshingly engages a drive gear 502 mounted on the connecting shaft 504 that delivers power to, and receives power from, the second motor/generator 490.

A second drive gear 505 is mounted on the connecting shaft 504 meshingly to engage a first transfer gear 506 mounted on a transfer shaft 507. A second transfer gear 508 is also mounted on the transfer shaft 507, and the second transfer gear 508 meshingly engages an output gear 509 presented from a sleeve shaft 511 that circumscribes the output shaft 452. The output gear 509 is selectively connected to the output shaft 452 by the first torque transfer device 454.

As should be apparent from the foregoing description, and with particular reference to FIG. 5, the transmission 410 continuously receives power from the engine 414. As will now be explained, the transmission 410 also receives power from an electric storage device 482. The electric storage device 482 may be one or more batteries. Other electric storage devices that have the ability to store electric power and dispense electric power may be used in place of the batteries without altering the concepts of the present invention. The electric storage device 482 communicates with an electrical control unit (ECU) 484 by transfer conductors 486A and 486B. The ECU 484 communicates with the first motor/generator 488 by transfer conductors 486C and 486D, and the ECU 484 similarly communicates with the second motor/generator 490 by transfer conductors 486E and 486F.

Third alternative embodiment

Figure 6:
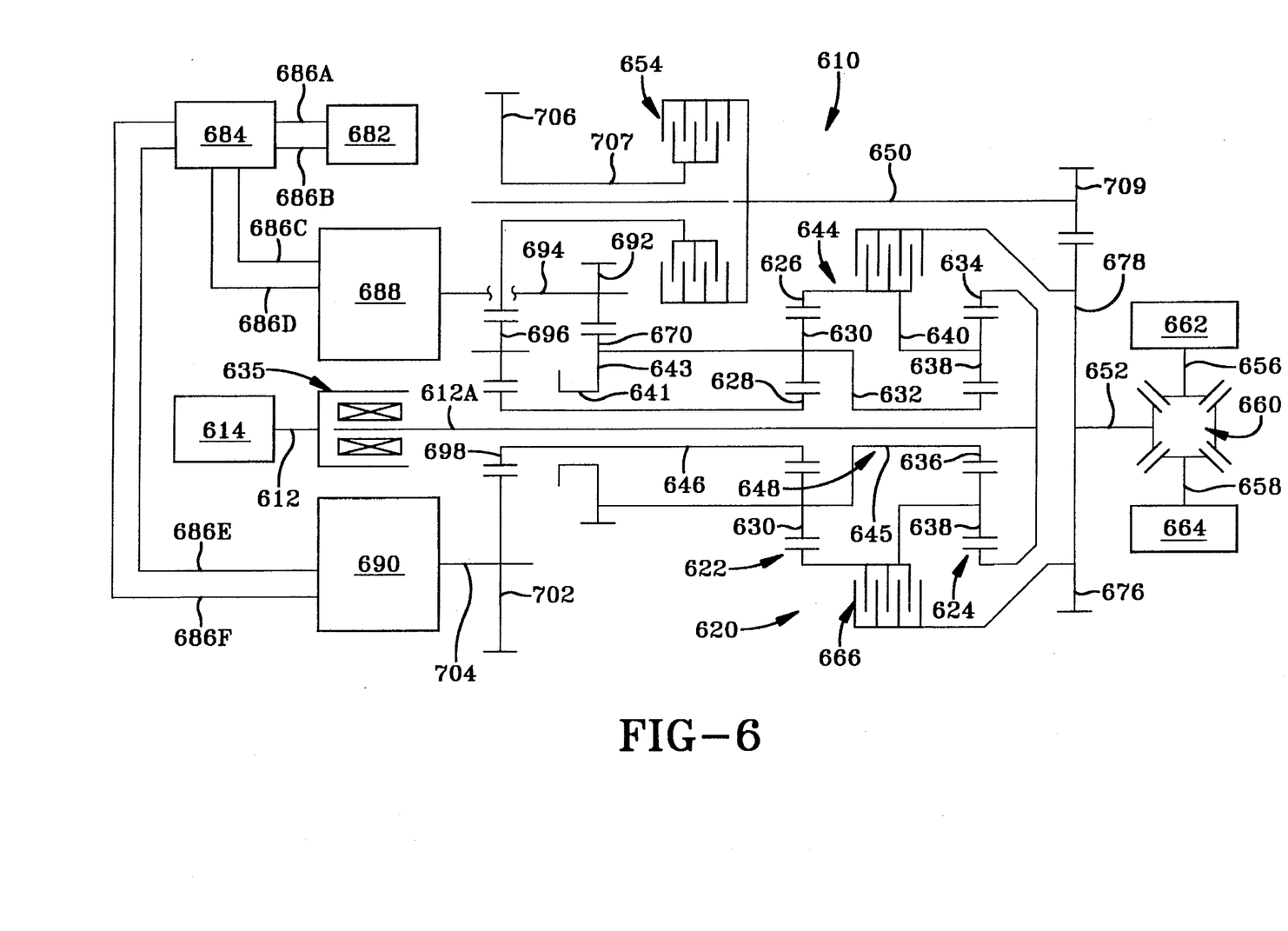
FIG. 6 is a schematic representation of a third alternative form of a two-mode, compound-split, elctro-mechanical transmission embodying the concepts of the present invention; and, FIG. 7 is a schematic representation of a fourth alternative form of a two-mode, compound-split, electro-mechanical transmission embodying the concepts of the present invention.

A third alternative form of a two-mode, compound-split, electro-mechanical transmission embodying the concepts of the present invention is designated generally by the numeral 610 on FIG. 6 of the accompanying drawings. With particular reference, then, to FIG. 6, the transmission 610 has an input shaft means 612 that is directly driven by an engine 614. In this embodiment, as well, the engine 614 may be a fossil fuel engine, such as a diesel engine which is readily adapted to provide its available power output delivered at a constant number of revolutions per minute (RPM). In the third alternative embodiment to which FIG. 6 is directed, the engine 614 can—after start-up, and during the majority of its input—operate at a constant speed of, for example, approximately 2100 RPM. The input shaft 612 is also selectively connected to a compound planetary gear set 620.

The compound planetary gear set 620 includes first and second planetary gear sub-sets 622 and 624. The first planetary gear sub-set 622 has an outer gear member 626, generally designated as the ring gear, which circumscribes an inner gear member 628, generally designated as the sun gear. A plurality of planet gear members 630 are rotatably mounted on a carder 632 such that each planet gear member 630 meshingly engages both the outer gear member 626 and the inner gear member 628.

The second planetary gear sub-set 624 also has an outer gear member 634, generally designated as the ring gear, which circumscribes an inner gear member 636, generally designated as the sun gear. A plurality of planet gear members 638 are rotatably mounted on a carrier 640 such that each planet gear 638 meshingly engages both the outer gear member 634 and the inner gear member 636.

The first and second planetary gear sub-sets 622 and 624 are compounded in that the outer gear member 626 of the first planetary gear sub-set 622 may be conjoined, as through a first sleeve shaft 642, to the carrier 640 of the second planetary gear sub-set 624 to constitute the conjoined first compounded gear members 644. The planetary gear sub-sets 622 and 624 are further compounded in that the carrier 632 of the first planetary gear sub-set 622 may also be conjoined—as through a second sleeve shaft 645, which circumscribes an input extension shaft 612A—to the inner gear member 636 of the second planetary gear sub-set 624 to constitute the conjoined second compounded gear members 648.

The first compounded gear members 644 are selectively connected to a output shaft 652, as through a second torque transfer device 666, that drives the axles 656 and 658 through a differential 660. When the hybrid transmission 610 is used in a land vehicle, each axle 656 and 658 terminates in a respective wheel 662 and 664. It should be noted that the second torque transfer device 666 is supported from the hub portion 678 of an output gear 676, and the output shaft 652 emanates from the center of the hub portion 678.

The outer gear member 634 of the second planetary gear sub-set 624 is directly connected to the input extension shaft 612A which is, in turn, connected to the input shaft 612 through a one-way clutch 635.

The second compounded gear members 648 are connected to the hub portion 643 of a transfer gear 670 that extends radially outwardly from an outer sleeve shaft 641 meshingly to engage a drive gear 692 mounted on the connecting shaft 694 that delivers power to, and receives power from, a first motor/generator 688. The inner gear member 628 of the first planetary gear sub-set 622 is connected to an inner sleeve shaft 646 that circumscribes the input shaft extension 612A. The inner sleeve shaft 646 presents a transfer gear 698 that meshingly engages a drive gear 702 mounted on the connecting shaft 704 that delivers power to, and receives power from, the second motor/generator 690. The transfer gear 698 also meshingly engages an idler gear 696 which, in turn, meshingly engages a first transfer gear 706 mounted on a transfer sleeve shaft 707 that circumscribes an output shaft 650. One side of the transfer sleeve shaft connects to a first torque transfer device 654, and the other side of the torque transfer device 654 is connected to the output shaft 650. The output shaft 650 is also secured to an output transfer gear 709 that meshingly engages the output drive gear 676 to effect selective connection between the second motor/generator 690 and the output shaft 652.

As should be apparent from the foregoing description, and with particular reference to FIG. 6, the hybrid transmission 610 continuously receives power from the engine 614. As will now be explained, the hybrid transmission 610 also receives power from an electric storage device 682. The electric storage device 682 may be one or more batteries. Other electric storage devices that have the ability to store electric power and dispense electric power may be used in place of the batteries without altering the concepts of the present invention. The electric storage device 682 communicates with an electrical control unit (ECU) 684 by transfer conductors 686A and 686B. The ECU 684 communicates with the first motor/generator 688 by transfer conductors 686C and 686D, and the ECU 684 similarly communicates with the second motor/generator 690 by transfer conductors 686E and 686F.

Fourth alternative embodiment

Figure 7:
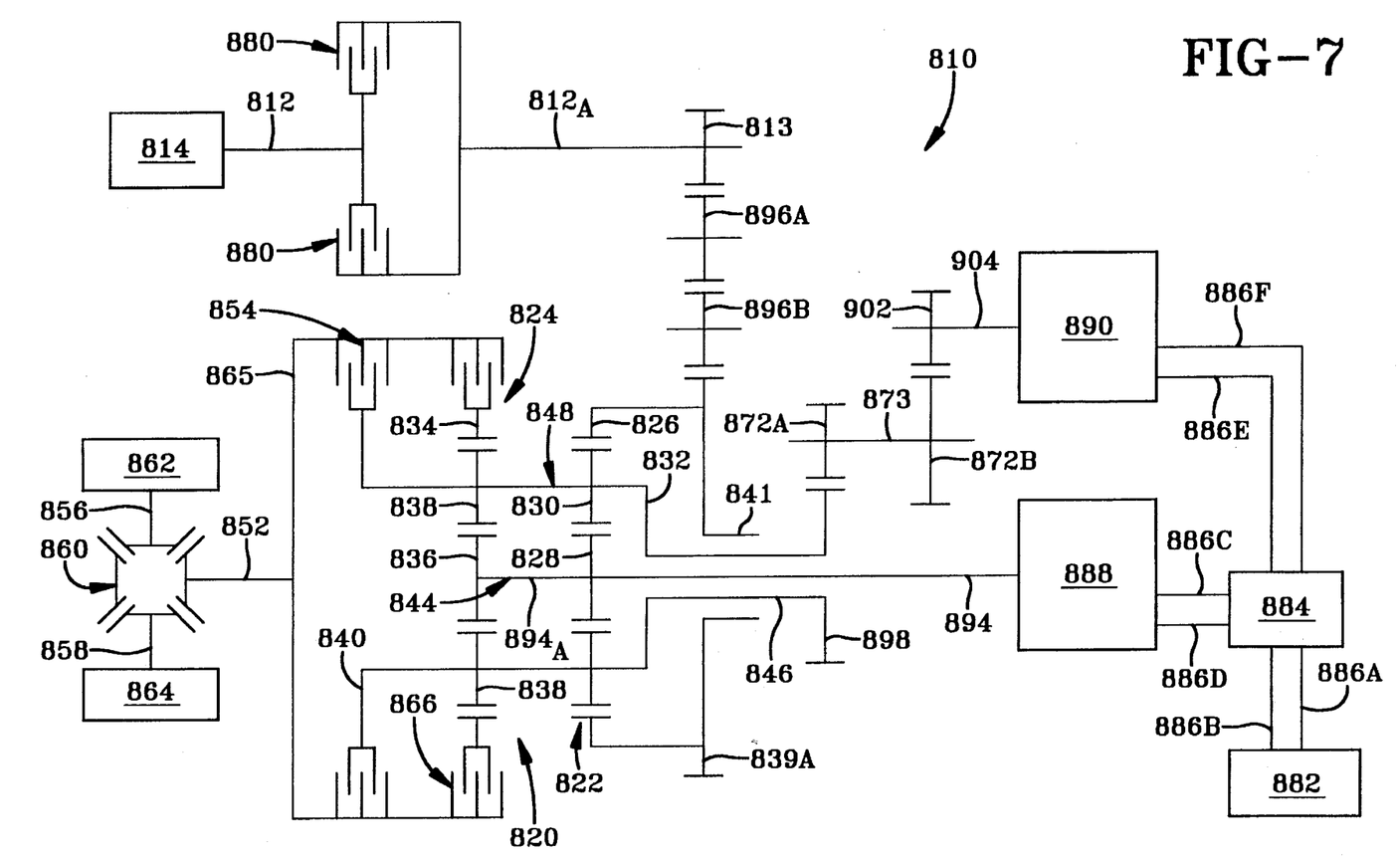

A fourth alternative form of a two-mode, compound-split, electro-mechanical transmission embodying the concepts of the present invention is designated generally by the numeral 810 on FIG. 7 of the accompanying drawings. With particular reference, then, to FIG. 7, the transmission 810 has an input shaft means 812 that is directly driven by an engine 814. In this embodiment, as well, the engine 814 may be a fossil fuel engine, such as a diesel engine which is readily adapted to provide its available power output delivered at a constant number of revolutions per minute (RPM). In the fourth alternative embodiment to which FIG. 7 is directed, the engine 814 can—after start-up, and during the majority of its input—operate at a constant speed of, for example, approximately 2100 RPM. The input shaft 812 is also selectively connected to an input shaft extension 812A through a third torque transfer device 880. An input gear 813 is mounted on the input shaft extension 812A meshingly to engage a first idler gear 896A which, in turn, meshingly engages a second idler gear 896B. The second idler gear 896B meshingly engages a transfer gear 839A that is supported on an outer sleeve shaft 841 and is connected to a compound planetary gear set 820.

The compound planetary gear set 820 includes first and second planetary gear sub-sets 822 and 824. The first planetary gear sub-set 822 has an outer gear member 826, generally designated as the ring gear, which circumscribes an inner gear member 828, generally designated as the sun gear. A plurality of planet gear members 830 are rotatably mounted on a carrier 832 such that each planet gear member 830 meshingly engages both the outer gear member 826 and the inner gear member 828.

The second planetary gear sub-set 824 also has an outer gear member 834, generally designated as the ring gear, which circumscribes an inner gear member 836, generally designated as the sun gear. A plurality of planet gear members 838 are rotatably mounted on a carrier 840 such that each planet gear member 838 meshingly engages both the outer gear member 834 and the inner gear member 836.

The first and second planetary gear sub-sets 822 and 824 are compounded in that the inner gear members 828 and 836 of the respective first and second planetary gear sub-sets 822 and 824, respectively, are secured, one to the other, as by an extension portion 894A of shaft 894 to constitute the conjoined first compounded gear members 844. It will be noted that the shaft 894 constitutes the connecting member that delivers power to, and receives power from, the first motor/generator 888. The first and second planetary gear sub-sets 822 and 824 are further compounded in that the carrier 832 in the first planetary gear sub-set 822 is secured to the carrier 840 of the second planetary gear sub-set 824—both of which are supported on one end portion of an inner sleeve shaft 846—to constitute the conjoined second compounded gear members 848 in the planetary gear set 820.

The second compounded gear members 848 are selectively connected to a output shaft 852, as through a first torque transfer device 854 that may be supported from a radial extension 865 of the output shaft 852. The output shaft 852 drives the axles 856 and 858 through a differential 860. When the hybrid transmission 810 is used in a land vehicle each, axle 856 and 858 terminates in a respective wheel 862 and 864.

The outer gear member 834 of the second planetary gear sub-set 824 is also selectively connected to the output shaft 852, as through a second torque transfer device 866, and the second torque transfer device 866 may also be supported from the radial extension 865 of the drive shaft.

The other end of the inner sleeve shaft 846 presents a transfer gear member 898 which meshingly engages an idler gear 872A that is supported from an idler shaft 873. A second idler gear 872B is also supported on the idler shaft 873 meshingly to engage a drive gear 902 mounted on the connecting shaft 904 that delivers power to, and receives power from, a second motor/generator 890.

As should be apparent from the foregoing description, and with particular reference to FIG. 7, the hybrid transmission 810 continuously receives power from the engine 814. As will now be explained, the hybrid transmission 810 also receives power from an electric storage device 882. The electric storage device 882 may be one or more batteries. Other electric storage devices that have the ability to store electric power and dispense electric power may be used in place of the batteries without altering the concepts of the present invention. The electric storage device 882 communicates with an electrical control unit (ECU) 884 by transfer conductors 886A and 886B. The ECU 884 communicates with the first motor/generator 888 by transfer conductors 886C and 886D, and the ECU 884 similarly communicates with the second motor/generator 890 by transfer conductors 886E and 886F.

Conclusion

While only a preferred, and four alternative, embodiments of the present invention are disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

As should now be apparent, the present invention not only teaches that a transmission embodying the concepts of the present invention is capable of providing high overall efficiency, particularly at high output speeds, but also that the other objects of the invention can likewise be accomplished.

What is claimed is:

1. An electro-mechanical transmission, comprising:

input means for receiving power from an engine;

power output means;

first and second motor/generators;

energy storage means for accepting power from, and supplying power to, said first and second motor/generators;

control means for regulating power flow between said energy storage means and said motor/generators as well as between said first and second motor/generators;

a compound planetary gear set having first and second planetary gear sub-sets;

each of said planetary gear sub-sets having an inner gear member and an outer gear member, each of which meshingly engage a plurality of planet gear members;

means operatively to connect said first motor/generator to at least one of said gear members in said compound planetary gear set;

means operatively to connect said second motor/generator to at least one of the other of said gear members in said compound planetary gear set;

means operatively to connect said input means to at least one of the remaining gear members in said compound planetary gear set; and, means operatively to connect at least one of said gear members in said compound planetary gear set to said power output means.

2. An electro-mechanical transmission, as set forth in claim 1, wherein:

one of said gear members in said first planetary gear sub-set is continuously connected to one of said gear members in said second planetary gear sub-set;

said connected one of said gear members in said first planetary gear sub-set and one of said gear members in said second planetary gear sub-set comprise the first compounded gear members;

one of the other of said gear members in said first planetary gear sub-set is continuously connected to one of the other of said gear members in said second planetary gear sub-set;

said connected one of the other of said gear members in said first planetary gear sub-set and one of the other of said gear members in said second planetary gear sub-set comprise the second compounded gear members.

3. An electro-mechanical transmission, as set forth in claim 2, further comprising:

a first and second torque transfer device;

said first and second torque transfer devices effecting an operative connection between selected gear members in said compound planetary gear set and said power output means.

4. An electro-mechanical transmission, as set forth in claim 3, wherein:

at least one of said torque transfer devices operatively effects a selective connection between one of said motor/generators and said power output means.

5. An electro-mechanical transmission, as set forth in claim 4, wherein:

said outer gear member in said first planetary gear sub-set is continuously connected to said plurality of planet gear members in said second planetary gear sub-set;

said first compounded gear members comprise said outer gear member in said first planetary gear sub-set being continuously connected to said plurality of planet gear members in said second planetary gear sub-set.

6. An electro-mechanical transmission, as set forth in claim 5, wherein:

said plurality of planet gear members in said second planetary gear sub-set are rotatably mounted on a carrier;

said first compounded gear members in said first planetary gear sub-set are continuously connected to said carrier.

7. An electro-mechanical transmission, as set forth in claim 5, wherein:

said plurality of planet gear members in said first planetary gear sub-set are continuously connected to said outer gear member in said second planetary gear sub-set;

said second compounded gear members comprise said plurality of planet gear members in said first planetary gear sub-set being continuously connected to said outer gear member in said second planetary gear sub-set.

8. An electro-mechanical transmission, as set forth in claim 7, wherein:

said plurality of planet gear members in said first planetary gear sub-set are rotatably mounted on a carrier;

said second compounded gear members comprise said carrier being continuously connected to said outer gear member in said second planetary gear sub-set.

9. An electro-mechanical transmission, as set forth in claim 7, further comprising:

a third torque transfer device;

said third torque transfer device operatively effecting a selective connection between said input means and said first compounded gear members;

one of said motor/generators being operatively connected to said inner gear member of said first planetary gear sub-set;

another of said motor/generators being operatively connected to said inner gear member of said second planetary gear sub-set;

said power output means being selectively connected to said second compounded gear members; and, said power output means also being selectively connected to said inner gear member of said second planetary gear set.

10. An electro-mechanical transmission, as set forth in claim 7, wherein:

said input means is operatively connected to said inner gear member of said second planetary gear sub-set;

one of said motor/generators is operatively connected to said second compounded gear members;

another of said motor/generators is operatively connected to said inner gear member of said first planetary gear sub-set;

said power output means is selectively connected to said first compounded gear members; and, said power output means is also selectively connected to said inner gear member in said first planetary gear sub-set.

11. An electro-mechanical transmission, as set forth in claim 5, wherein:

one of said motor/generators is operatively connected to said inner gear member of said first planetary gear sub-set;

said power output means is selectively connected to said first compounded gear members; and, said power output means is also selectively connected to said inner gear member of said first planetary gear sub-set.

12. An electro-mechanical transmission, as set forth in claim 11, wherein:

said input means is operatively connected to said outer gear member in said second planetary gear sub-set;

said plurality of planet gear members in said first planetary gear sub-set is continuously connected to said inner gear member of said second planetary gear sub-set;

said second compounded gear members comprise said plurality of planet gear members in said first planetary gear sub-set being continuously connected to said inner gear member of said second planetary gear sub-set; and, one of said motor/generators is operatively connected to said second compounded gear members.

13. An electro-mechanical transmission, as set forth in claim 12, wherein:

said plurality of planet gear members in said first planetary gear sub-sets are rotatably mounted on a first carrier;

said first carrier is continuously connected to said inner gear member of said second planetary gear sub-set to comprise said second compounded gear members.

14. An electro-mechanical transmission, as set forth in claim 4, further comprising:

a third torque transfer device;

said third torque transfer device operatively effecting a selective connection between said input means and said outer gear member of said first planetary gear sub-set.

15. An electro-mechanical transmission, as set forth in claim 14, wherein:

said inner gear member of said first planetary gear sub-set is continuously connected to said inner gear member of said second planetary gear sub-set;

said first compounded gear members comprise said inner gear member of said first planetary gear sub-set being continuously connected to said inner gear member of said second planetary gear sub-set;

said plurality of planet gear members in said first planetary gear sub-set are continuously connected to said plurality of planet gear members in said second planetary gear sub-set;

said second compounded gear members comprise said plurality of planet gear members in said first planetary gear sub-set being continuously connected to said plurality of planet gear members in said second planetary gear sub-set;

one of said motor/generators is operatively connected to said first compounded gear members;

another of said motor/generators is operatively connected to said second compounded gear members;

said power output means is selectively connected to said outer gear member in said second planetary gear sub-set; and, said power output means is also selectively connected to said second compounded gear members.

16. An electro-mechanical transmission, as set forth in claim 15, wherein:

said plurality of planet gear members in said first and second planetary gear sub-sets are rotatably mounted on respective first and second carriers;

said first and second carriers are continuously connected;

said second compounded gear members comprise said continuously connected first and second carriers.

* * * * *